*US008117224B2*

United States Patent
Galfond

(10) Patent No.: US 8,117,224 B2
(45) Date of Patent: Feb. 14, 2012

(54) ACCURACY MEASUREMENT OF DATABASE SEARCH ALGORITHMS

(75) Inventor: Glenn J. Galfond, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/489,572

(22) Filed: Jun. 23, 2009

(65) Prior Publication Data

US 2010/0325134 A1  Dec. 23, 2010

(51) Int. Cl.
*G06F 7/00* (2006.01)
(52) U.S. Cl. ...................................................... 707/759
(58) Field of Classification Search .................. 707/706, 707/713, 758, 759, 723, 731, 722, 999.03, 707/999.04; 706/45
See application file for complete search history.

(56) References Cited

U.S. PATENT DOCUMENTS

| | | | |
|---|---|---|---|
| 6,865,567 B1 | 3/2005 | Oommen et al. | |
| 7,287,020 B2 * | 10/2007 | Chaudhuri et al. | 1/1 |
| 2006/0085410 A1 * | 4/2006 | Chaudhuri et al. | 707/3 |
| 2006/0085463 A1 * | 4/2006 | Chaudhuri et al. | 707/100 |
| 2006/0136402 A1 | 6/2006 | Lee | |
| 2007/0073641 A1 | 3/2007 | Perry et al. | |
| 2007/0185831 A1 | 8/2007 | Churcher | |
| 2008/0298642 A1 | 12/2008 | Meenen | |
| 2009/0030862 A1 * | 1/2009 | King et al. | 706/45 |

OTHER PUBLICATIONS

IBM, "Using Different Search Element and a Slider to Control Accuracy of Search Results in FullText Search Engine", IP.com No. IPCOM000174089D, Aug. 26, 2008, 9 pages.

* cited by examiner

*Primary Examiner* — Hung T Vy
(74) *Attorney, Agent, or Firm* — Douglas A. Lashmit; Hoffman Warnick LLC

(57) ABSTRACT

A system, method and program product for evaluating search algorithms. A method is provided that includes: defining a population of searches and database records from a search history database; applying a sampling method and direct sampling rates to each search/record pair in the population using a computing system, wherein search/record pairs having a higher variability relative to the population are assigned a relatively higher probability; randomly sampling a direct sample of search/record pairs with the computing system using the direct sampling rates to increase a likelihood of obtaining search/record pairs having the higher variability; running a search algorithm and measuring errors for the direct sample and/or for an associated indirect sample; and calculating an estimated error rate for the search algorithm using inverse probability weighting.

21 Claims, 4 Drawing Sheets

ACCURACY MEASUREMENT OF DATABASE SEARCH ALGORITHMS

FIELD OF THE INVENTION

This disclosure is related to a system and method of measuring the accuracy of database search algorithms, and more particularly to a system and method of measuring accuracy using unequal probability sampling to randomly sample search/database record pairs.

BACKGROUND OF THE INVENTION

Database search algorithms are used in many types of systems. For example, biometric search algorithms are used to determine whether or not the fingerprints found at a crime scene match those in a biometric repository, web search algorithms are used to find web pages relevant to a user query, etc.

In general, search algorithms allow a user to enter a query, such as a key word, and return a set of (i.e., zero, one or more) database records that the algorithm identifies as matching the query. Depending on the database, query and accuracy, a particular algorithm may or may not return records that actually match the query. Because there are numerous different types of search algorithms, providing a process for evaluating search algorithms is useful for selecting a search algorithm that will best optimize search performance.

Evaluations of the accuracy of database search algorithms are typically performed using a sample of the database and a sample of the searches. Samples are used because it would be too time consuming and costly to evaluate accuracy for all searches of the entire database. The known solutions to this problem all involve selecting a sample of searches and database records that have been identified by some method as being matched to each other. Often this sample is supplemented with additional random samples of searches and database records.

There are at least two issues with the known solutions to this problem. First, the known solutions produce biased results because they select a sample from a pool of queries and database records that have been matched using existing systems. Information retrieval evaluation based on this method is inherently biased against systems that did not contribute to the pool. A second problem with existing solutions is that very large samples are needed to measure very small error rates, such as the False Accept Rate (FAR) of fingerprint matching algorithms. Larger sample sizes make the evaluation of search algorithms more costly and time consuming.

SUMMARY OF THE INVENTION

The present invention relates to a system, method and program product for evaluating search algorithms using unequal probability sampling and inverse probability weighting. In one embodiment, there is a method for evaluating a search algorithm, comprising: defining a population of searches and database records from a search history database to provide a plurality of search/record pairs; applying a sampling method and direct sampling rates to each search/record pair in the population using a computing system, wherein search/record pairs having a higher variability relative to the population are assigned a relatively higher probability; randomly sampling a direct sample of search/record pairs with the computing system using the direct sampling rates to increase a likelihood of obtaining search/record pairs having the higher variability; running a search algorithm and measuring errors for the direct sample; and calculating an estimated error rate for the search algorithm using inverse probability weighting.

In a second embodiment, there is a computer readable medium having a computer program product stored thereon, which when executed by a computer processor, evaluates a search algorithm and comprises: program code for defining a population of searches and database records from a search history database to provide a plurality of search/record pairs; program code for applying a sampling method and direct sampling rates to each search/record pair in the population, wherein search/record pairs having a higher variability relative to the population are assigned a relatively higher probability; program code for randomly sampling a direct sample of search/record pairs using the direct sampling rates to increase a likelihood of obtaining search/record pairs having the higher variability; program code for running a search algorithm and measuring errors for the direct sample; and program code calculating an estimated error rate for the search algorithm using inverse probability weighting.

In a third embodiment, there is an algorithm evaluation system for evaluating a search algorithm, comprising: a system for defining a population of searches and database records from a search history database to provide a plurality of search/record pairs; a system for applying a sampling method and direct sampling rates to each search/record pair in the population, wherein search/record pairs having a higher variability relative to population are assigned a relatively higher probability; a system for randomly sampling a direct sample of search/record pairs using the direct sampling rates to increase a likelihood of obtaining search/record pairs having the higher variability; a system for measuring errors for the direct sample using a search algorithm; and a system for calculating an estimated error rate for the search algorithm using inverse probability weighting.

In a fourth embodiment, there is a method for deploying a system for evaluating search algorithms, comprising: providing a computer infrastructure being operable to: define a population of searches and database records from a search history database to provide a plurality of search/record pairs; apply a sampling method and direct sampling rates to each search/record pair in the population of searches using a computing system, wherein search/record pairs having a higher variability relative to the population are assigned a relatively higher probability; randomly sample a direct sample of search/record pairs with the computing system using the direct sampling rates to increase a likelihood of obtaining search/record pairs having the higher variability; run a search algorithm and measure errors for the direct sample; and calculate an estimated error rate for the search algorithm using inverse probability weighting.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
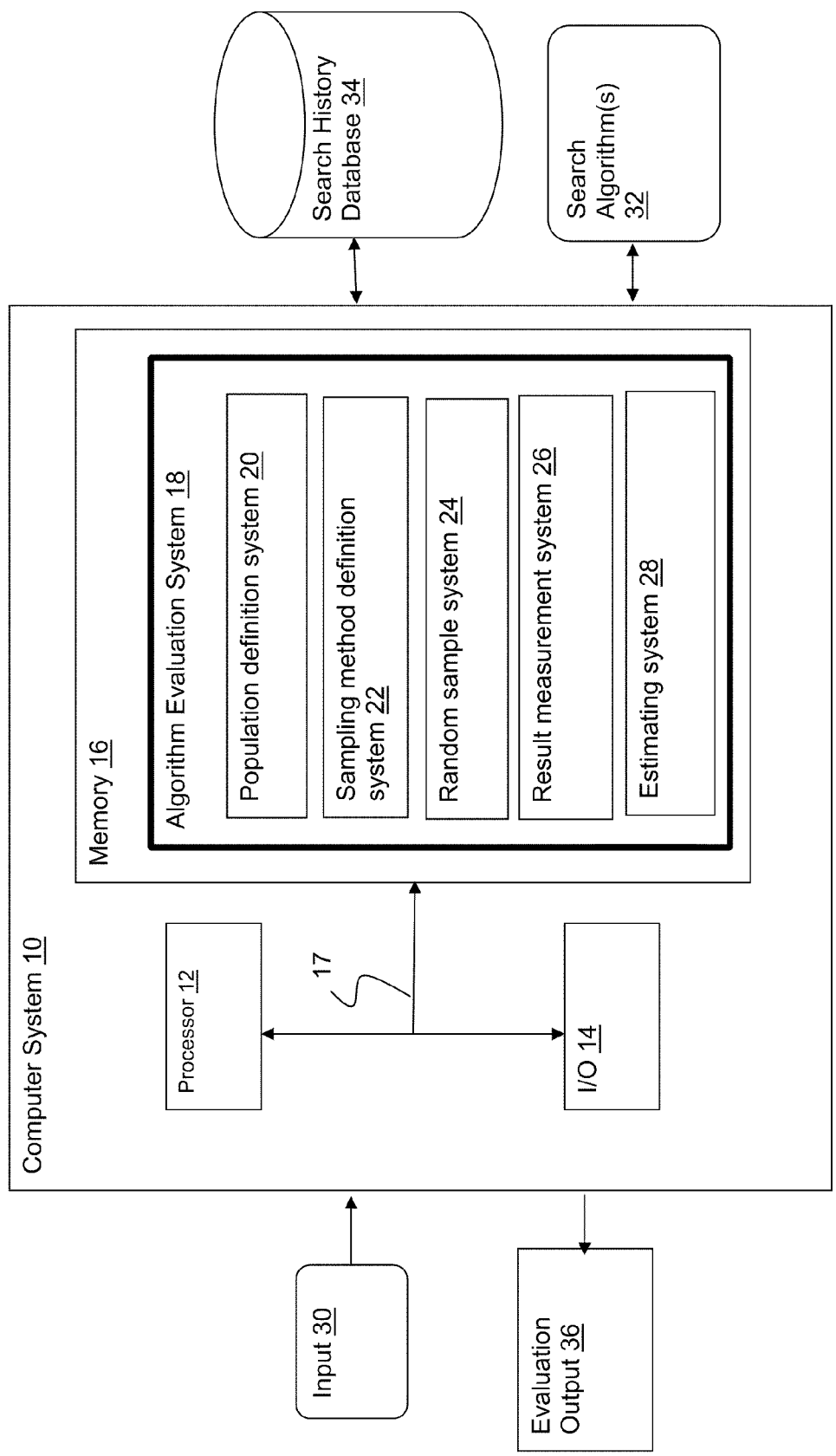
FIG. 1 depicts a computer system having an algorithm evaluation system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 depicts an illustrative embodiment of a computer system 10 that includes an algorithm evaluation system 18 for evaluating one or more search algorithms 32 by analyzing search data from a search history database 34. The result of the analysis is an evaluation output 36 (e.g., a printout, a user interface display, a report, an XML file, etc.) that provides an indication of the accuracy of one or more search algorithms 32. Algorithm evaluation system 18 may, for instance, be implemented as a computer program product stored on a computer readable medium, which when executed by processor 12, implements one or more features described herein.

Accuracy of each search algorithm 32 is measured using unequal probability sampling to randomly sample search data stored in the search history database 34. Search data can generally be represented as a matrix of: (1) search queries submitted, and (2) records that were searched, with each entry in the matrix being referred to herein as a "search/record pair". In an illustrative embodiment, each entry is scored to indicate, e.g., a relevance of a given record to the inputted search query. Scores may be determined in any manner, e.g., by the search algorithm that originally performed the search, by another automated or manual process, etc.

Figure 2:
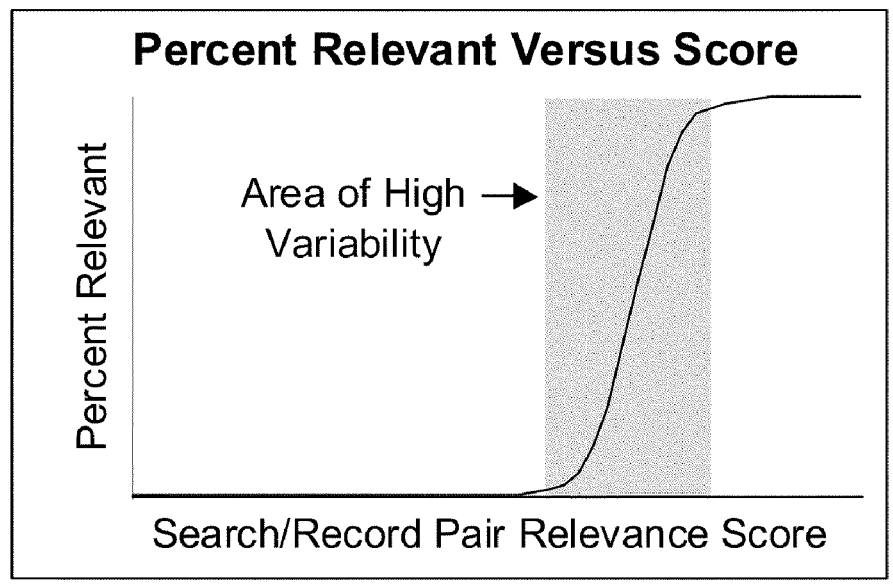
FIG. 2 depicts a pair of graphs describing high variability in accordance with an embodiment of the present invention.
Figure 2:
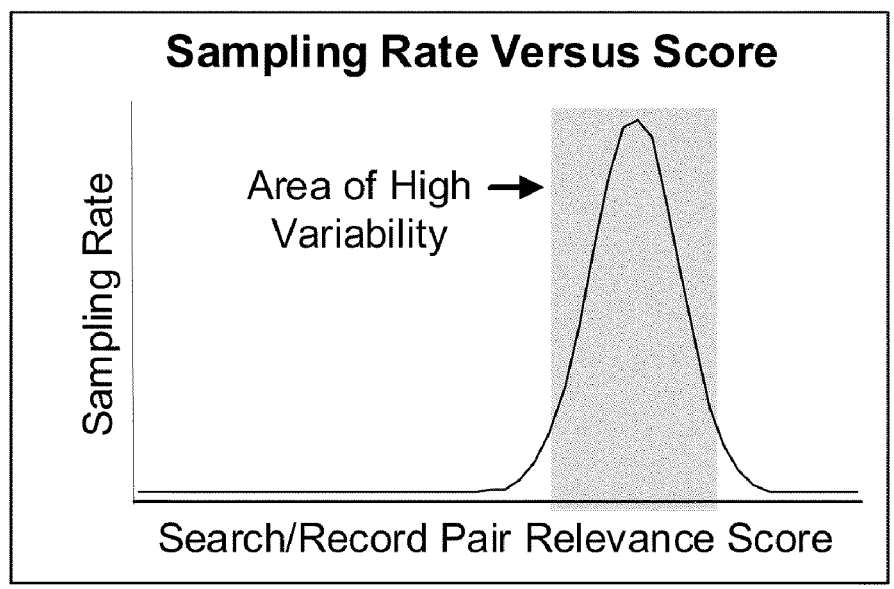

Inverse probability weighting is used to account for the unequal sampling probabilities when extrapolating the evaluation results from the sample to the population in order to produce statistically unbiased measurements. FIG. 2 provides an example that illustrates the concept. The top graph in FIG. 2 depicts the typical behavior of a search algorithm. As noted, a score is provided that summarizes the relevance of a database record to a search query. On the left of the graph are a set of records that scored low and have a low relevance. On the right of the graph is a second set of records that have a high score and highly relevant. In the middle of the graph there is a set of records that represent an area of high variability, in which there is some uncertainty as to the efficacy of the results. For low scores the database record is almost never relevant to the search, and for high scores the database record is almost always relevant to the search. For scores in the middle the results are more variable, with searches sometime retrieving relevant records and sometimes not.

The current approach uses unequal probability sampling to increase sampling rates in the area of high variability, as illustrated in the bottom graph in FIG. 2. Note that in one embodiment, an existing search algorithm is used to identify the area of high variability. However, other techniques could likewise be used. For example, in biometric searches, low quality images are known to decrease matching accuracy, and this information can be used to identify subsets of the population where variability is greater. Regardless, the approach uses inverse probability weighting when extrapolating results from the sample to the population in order to account for these unequal sampling probabilities. Accordingly, the results include statistically unbiased measurements, avoiding the measurement bias of current approaches, and the process enables search accuracy to be measured using sample sizes that are smaller than previously possible.

Referring again to FIG. 1, algorithm evaluation system 18 includes a population definition system 20, a sampling method definition system 22, a random sample system 24, a result measurement system 26 and an estimating system 28.

Figure 3:
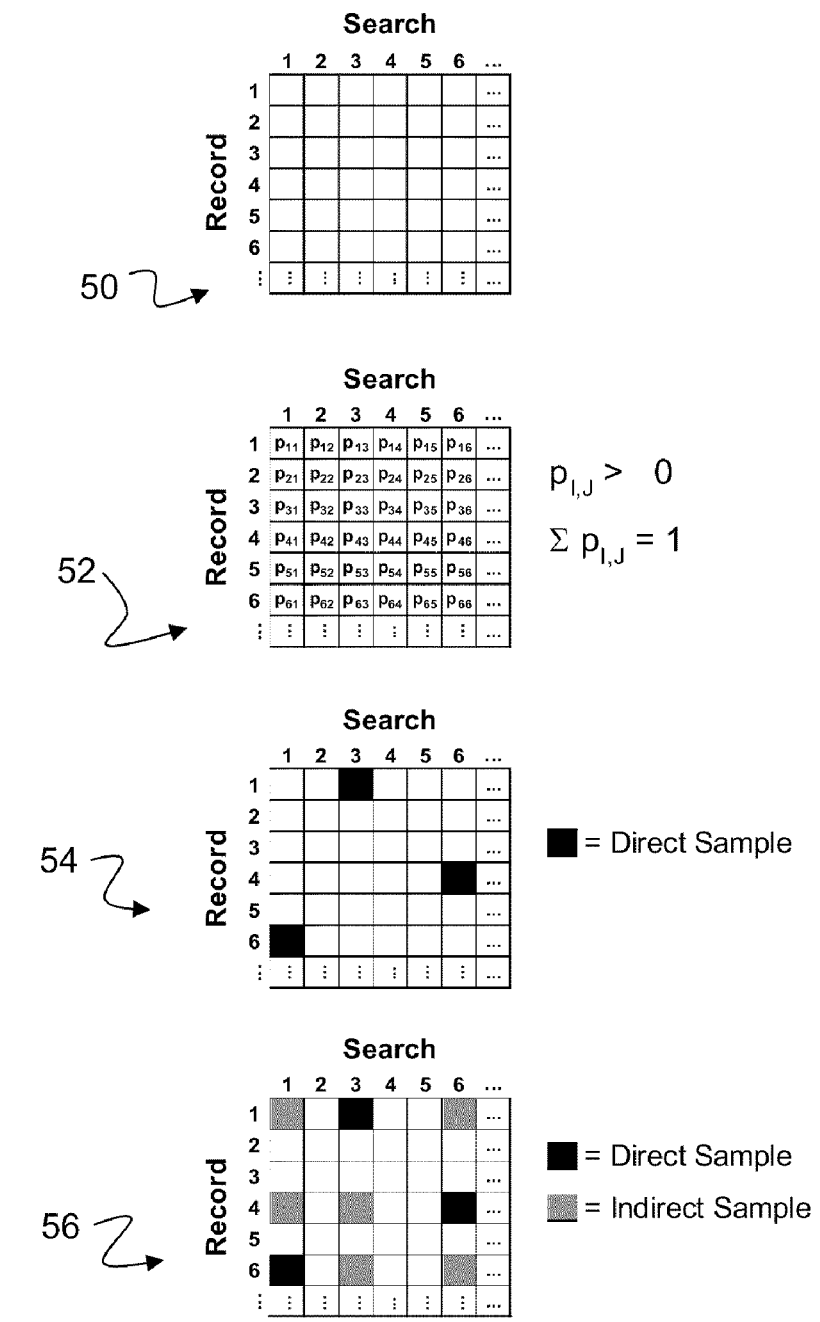
FIG. 3 depicts search/record matrices in accordance with an embodiment of the present invention.

Population definition system 20 defines the population for which search accuracy is to be measured. This population is a set of searches and a set of records available for searching. The population may be defined via some input 30 using current and/or historical data. For example, the population of searches might be defined as all searches performed over the last 12 months, and the population of database records might be defined as a snapshot of a database repository at a particular point in time. The population may also be based on projections of future searches and a future database. In FIG. 3, matrix 50 depicts an illustrative population.

Sampling method definition system 22 defines the sampling method and applies the direct sampling rates for search/record pairs. The sampling method can be any form of probability sampling, including, e.g., stratified sampling, probability proportionate to size sampling, and multi-stage (e.g., cluster) sampling. For instance, in stratified sampling, the population embraces a number of distinct categories that can be organized into separate "strata." Each stratum is then sampled as an independent sub-population, out of which individual elements can be randomly selected. Thus, for example, search/record pairs having a low relevance score could form one strata, search/record pairs having a high relevance score could form a second strata, and search/record pairs having relevance scores in between the others indicating high variability relative to the overall population could form a third strata. The sampling rates for the strata having high variability could be relatively higher in order to ensure that search/record pairs of high variability are more frequently included in the sample. Regardless of the method used, sampling rates that define the probabilities with which search/record pairs will be sampled are provided. For instance, as shown in matrix 52 of FIG. 3, each search/record pair is assigned a probability that it will be sampled, with all probabilities "p" totaling to one. As noted, probabilities are generally higher for entries that have higher variability.

Random sample system 24 selects a random sample of search/record pairs using the defined sampling method and sampling rates. Accordingly, each random selection has an increased likelihood of containing a higher variability search result. This sample is referred to as the direct sample. An example of a direct sample having three selections is shown in matrix 54 in FIG. 3.

Result measurement system 26 measures an accuracy or error rate of a search algorithm 32 for the search/record pairs in the direct sample. In addition to measuring the direct sample, an indirect sample may also be considered. For example, if the direct sample were the pairs (search 1, record 2) and (search 3, record 4), then the measurement would also consider the indirect sample (search 1, record 4) and (search 3, record 2). These additional search/record pairs define an indirect sample of search/record pairs that were not selected as part of the direct sample but are observed during the evaluation.

Result measurement system 26 essentially applies the search algorithm 32 to each entry of the direct sample to determine accuracy. In order to implement such a measurement, each search/record pair in the direct sample must first be evaluated (off-line) to determine if the record is a match for the search. In other words, for a given search, is the associated record a match for the inputted query? Optionally, accuracy for the indirect sample may also be evaluated (off-line) and included in the evaluation. Then, the search algorithm 32 can be run using the search to determine if the correct result is provided, i.e., does the search algorithm 32 indicate that the record is a match when it should and not indicate the record as a match when it should not. If the search algorithm 32 correctly evaluates the search for a given entry, then the error X for the entry is "0." Conversely, if the search algorithm 32 evaluates the entry incorrectly, then the error X for entry is "1." Obviously, other values could be utilized to measure error.

Estimating system 28 estimates population totals (i.e., error rates) using inverse probability weighting. The weights W, referred to as sampling weights, are equal to the inverse of the expected number of times a member of the population would be included in the direct, indirect, or combined (direct plus indirect) sample:

$$W_{Combined,I,J}=1/(\text{Expected number of times unit}(I,J)\text{is selected in the direct or indirect sample});$$

$$W_{Direct,I,J}=1/(\text{Expected number of times unit}(I,J)\text{is selected in the direct sample});$$

$$W_{Indirect,I,J}=1/(\text{Expected number of times unit}(I,J)\text{is selected in the indirect sample}).$$

The sampling weights (W) are determined by the specific sampling method and sampling rates used. For example, consider a replacement probability proportionate to size sample where n selections are made from the population and the probability of selecting the pair (search I, record J) in each selection is equal to $p_{I,J}$. In this case, the sampling weights would be:

$$W_{Combined,I,J}=1/(np_{I,J}+n(n-1)(\Sigma_{K\ne J}p_{K,J})(\Sigma_{K\ne I}p_{I,K}))$$

$$W_{Direct,I,J}=1/(np_{I,J})$$

$$W_{Indirect,I,J}=1/(n(n-1)(\Sigma_{K\ne J}p_{K,J})(\Sigma_{K\ne I}p_{I,K}))$$

Estimates $\hat{X}$ of population totals are computed as weighted totals of the direct, indirect and combined samples:

$$\hat{X}_{Combined}=\Sigma_{Direct\ \&\ Indirect\ Samples}X_{I,J}W_{Combined,I,J}$$

$$\hat{X}_{Direct}=\Sigma_{Direct\ Sample}X_{I,J}W_{Direct,I,J}$$

$$\hat{X}_{Indirect}=\Sigma_{Indirect\ Sample}X_{I,J}W_{Indirect,I,J}$$

where $X_{I,J}$ is the measured error (e.g., 0 or 1 as described above). In addition, these three estimates can be combined using a weighted total with weights that sum to one (i.e., using weights a, b, and 1−a−b for any values of a and b).

$$\hat{X}=a\hat{X}_{Combined}+b\hat{X}_{Direct}+(1-a-b)\hat{X}_{Indirect}$$

In one embodiment, population estimates are computed for the total number of relevant search/record pairs, the total number of search/record pairs retrieved by the search algorithm 32, and the total number of relevant search/record pairs retrieved by the search algorithm 32. Ratios of these estimated population totals are typically used to quantify search algorithm accuracy. For example, two commonly used measures of search algorithm accuracy are recall and precision:

Recall=(relevant records retrieved)/(relevant records)

Precision=(relevant records retrieved)/(retrieved records)

Any or all of these estimates or measures may be included in the evaluation output 36.

FIG. 3 depicts an illustration of how sampling is implemented. Matrix 50 shows a population of search record pairs, with searches shown along the horizontal axis and database records shown along the vertical axis. Each record is given a probability $p_{I,J}$ as shown in matrix 52, indicating a likelihood of being selected in the random sample. Note that the sum of all the probabilities equals one. Matrix 54 depicts three direct samples being selected, $p_{3,1}$, $p_{6,4}$ and $p_{1,6}$. In matrix 56, additional indirect samples are obtained. Indirect samples are obtained from any intersections on the graph of direct samples. For instance direct samples $p_{3,1}$ and $p_{6,4}$ intersect at $p_{3,4}$.

Figure 4:
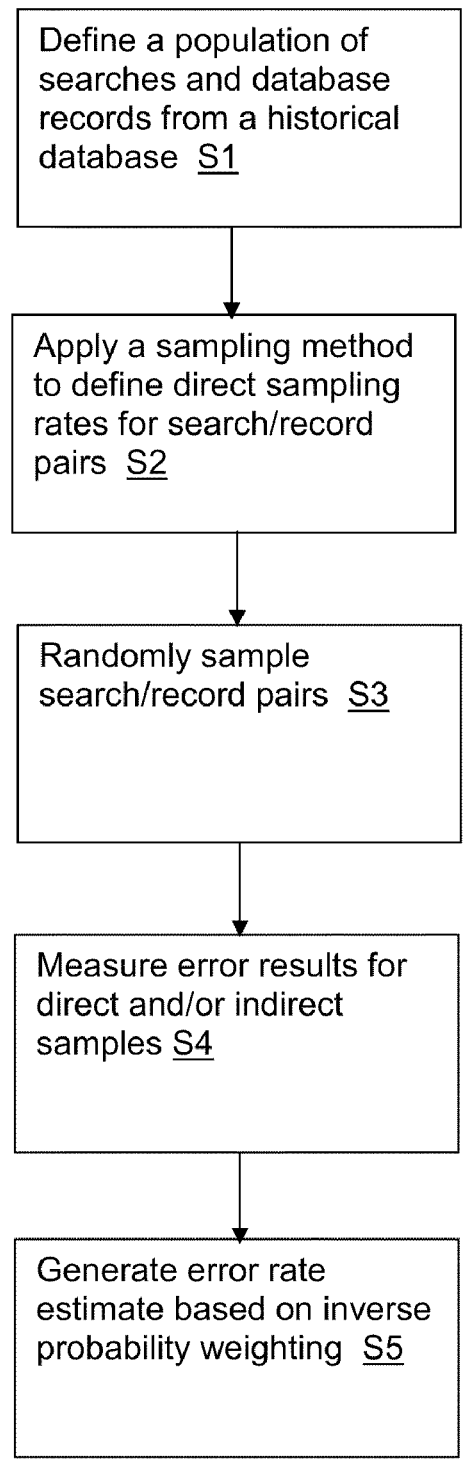
FIG. 4 depicts a flow diagram showing a method in accordance with an embodiment of the present invention.

FIG. 4 depicts a flow diagram showing an illustrative method of the present invention. At step S1, a population of searches and database records are defined from a search history database. Note that the search history database may comprise data from any number or type of sources that involve search queries and records available to search. Next, at S2, a sampling method is selected and direct sampling rates are defined for each search/record pair in the population. As noted, search/record pairs having a higher variability relative to the population are assigned a relatively higher probability of being sampled. At S3, the population is randomly sampled to create a direct sample of search/record pairs. Accordingly, the direct sample contains search/record pairs with an increased likelihood of having the higher variability. At S4, errors are measured for a search algorithm with respect to the direct sample. Errors may also be measured for an associated indirect sample. Finally, at S5, an estimated error rate is calculated for the search algorithm using inverse probability weighting.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising an algorithm evaluation system 18 could be created, maintained and/or deployed by a service provider that offers the functions described herein for customers. That is, a service provider could offer to deploy or provide the ability to evaluate search algorithms 32 as described above.

It is understood that in addition to being implemented as a system and method, the features may be provided as a program product stored on a computer-readable medium, which when executed, enables computer system 10 to provide an algorithm evaluation system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for evaluating a search algorithm, comprising:
defining a population of searches and database records from a search history database to provide a plurality of search/record pairs;
applying a sampling method and direct sampling rates to each search/record pair in the population using a computing system, wherein search/record pairs having a higher variability relative to the population are assigned a relatively higher probability;
randomly sampling a direct sample of search/record pairs with the computing system using the direct sampling rates to increase a likelihood of obtaining search/record pairs having the higher variability;
running a search algorithm and measuring errors for the direct sample; and
calculating an estimated error rate for the search algorithm using inverse probability weighting.

2. The method of claim 1, wherein the sampling method comprises a probability sampling selected from a group consisting of: stratified sampling, probability proportionate to size sampling, and multi-stage sampling.

3. The method of claim 1, wherein variability is determined based on a score associated with each search/record pair.

4. The method of claim 1, wherein measuring errors includes evaluating each search/record pair from at least one of the direct and indirect samples against the search algorithm to determine if the search algorithm returns a correct result.

5. The method of claim 4, wherein measuring errors additionally includes evaluating each search/record pair from an associated indirect sample against the search algorithm to determine if the search algorithm returns a correct result.

6. The method of claim 1, wherein the estimated error rate $\hat{X}$ is calculated with the equation:

$$\hat{X} = a\hat{X}_{Combined} + b\hat{X}_{Direct} + (1-a-b)\hat{X}_{Indirect}$$

wherein a, b and (1−a−b) are weights and:

$$\hat{X}_{Combined} = \Sigma_{Direct\ \&\ Indirect\ Samples} X_{I,J} W_{Combined,I,J}$$

$$\hat{X}_{Direct} = \Sigma_{Direct\ Sample} X_{I,J} W_{Direct,I,J}$$

$$\hat{X}_{Indirect} = \Sigma_{Indirect\ Sample} X_{I,J} W_{Indirect,I,J}$$

and wherein $X_{I,J}$ are error measurements for search/result pairs I and J, and $W_{Combined,I,J} = 1/$(Expected number of times unit$(I,J)$ is selected in the direct or indirect sample);

$W_{Direct,I,J} = 1/$(Expected number of times unit$(I,J)$ is selected in the direct sample);

$W_{Indirect,I,J} = 1/$(Expected number of times unit$(I,J)$ is selected in the indirect sample).

7. The method of claim 1, further comprising:
calculating a recall measurement as follows:

recall=(all relevant records retrieved by the search algorithm)/(all relevant records in the database records); and calculating a precision as follows:

precision=(all relevant records retrieved by the search algorithm)/(all records retrieved by the search algorithm).

8. A computer readable medium having a computer program product stored thereon, which when executed by a computer processor, evaluates a search algorithm and comprises:

program code for defining a population of searches and database records from a search history database to provide a plurality of search/record pairs;

program code for applying a sampling method and direct sampling rates to each search/record pair in the population, wherein search/record pairs having a higher variability relative to the population are assigned a relatively higher probability;

program code for randomly sampling a direct sample of search/record pairs using the direct sampling rates to increase a likelihood of obtaining search/record pairs having the higher variability;

program code for running a search algorithm and measuring errors for the direct sample; and program code calculating an estimated error rate for the search algorithm using inverse probability weighting.

9. The computer readable medium of claim 8, wherein the sampling method comprises a probability sampling selected from a group consisting of: stratified sampling, probability proportionate to size sampling, and multi-stage sampling.

10. The computer readable medium of claim 8, wherein variability is determined based on a score associated with each search/record pair.

11. The computer readable medium of claim 8, wherein the program code for measuring errors includes evaluating each search/record pair from the direct sample against the search algorithm to determine if the search algorithm returns a correct result.

12. The computer readable medium of claim 11, wherein the program code for measuring errors additionally includes evaluating each search/record pair from an associated indirect sample against the search algorithm to determine if the search algorithm returns a correct result.

13. The computer readable medium of claim 8, wherein the estimated error rate $\hat{X}$ is calculated with the equation:

$$\hat{X} = a\hat{X}_{Combined} + b\hat{X}_{Direct} + (1-a-b)\hat{X}_{Indirect}$$

wherein a, b and 1−a−b are weights and:

$$\hat{X}_{Combined} = \Sigma_{Direct\ \&\ Indirect\ Samples} X_{I,J} W_{Combined,I,J}$$

$$\hat{X}_{Direct} = \Sigma_{Direct\ Sample} X_{I,J} W_{Direct,I,J}$$

$$\hat{X}_{Indirect} = \Sigma_{Indirect\ Sample} X_{I,J} W_{Indirect,I,J}$$

and wherein $X_{I,J}$ are error measurements for search/result pairs I and J, and:

$W_{Combined,I,J} = 1/($Expected number of times unit$(I,J)$ is selected in the direct or indirect sample$)$;

$W_{Direct,I,J} = 1/($Expected number of times unit$(I,J)$ is selected in the direct sample$)$;

$W_{Indirect,I,J} = 1/($Expected number of times unit$(I,J)$ is selected in the indirect sample$)$.

14. The computer readable medium of claim 8, further comprising program code for calculating a recall measurement as follows:

recall=(all relevant records retrieved by the search algorithm)/(all relevant records in the database records);

and for calculating a precision as follows:

precision=(all relevant records retrieved by the search algorithm)/(all records retrieved by the search algorithm).

15. An algorithm evaluation system for evaluating a search algorithm, comprising:

a computer system having a processor and memory, and further comprising:

a system for defining a population of searches and database records from a search history database to provide a plurality of search/record pairs;

a system for applying a sampling method and direct sampling rates to each search/record pair in the population, wherein search/record pairs having a higher variability relative to the population are assigned a relatively higher probability;

a system for randomly sampling a direct sample of search/record pairs using the direct sampling rates to increase a likelihood of obtaining search/record pairs having the higher variability;

a system for measuring errors for the direct sample using a search algorithm; and a system for calculating an estimated error rate for the search algorithm using inverse probability weighting.

16. The algorithm evaluation system of claim 15, wherein the sampling method is selected from a group consisting of: stratified sampling, probability proportionate to size sampling, and multi-stage sampling.

17. The algorithm evaluation system of claim 15, wherein variability is determined based on a score associated with each search/record pair.

18. The algorithm evaluation system of claim 15, wherein the system for measuring errors additionally measures errors for an associated indirect sample, and includes a system for evaluating each search/record pair from the direct and indirect samples against the search algorithm to determine if the search algorithm returns a correct result.

19. The algorithm evaluation system of claim 18, wherein the estimated error rate $\hat{X}$ is calculated with the equation:

$$\hat{X} = a\hat{X}_{Combined} + b\hat{X}_{Direct} + (1-a-b)\hat{X}_{Indirect}$$

wherein a, b and 1−a−b are weights and:

$$\hat{X}_{Combined} = \Sigma_{Direct\ \&\ Indirect\ Samples} X_{I,J} W_{Combined,I,J}$$

$$\hat{X}_{Direct} = \Sigma_{Direct\ Sample} X_{I,J} W_{Direct,I,J}$$

$$\hat{X}_{Indirect} = \Sigma_{Indirect\ Sample} X_{I,J} W_{Indirect,I,J}$$

and wherein $X_{I,J}$ are error measurements for search/result pairs I and J, and:

$W_{Combined,I,J} = 1/($Expected number of times unit$(I,J)$ is selected in the direct or indirect sample$)$;

$W_{Direct,I,J} = 1/($Expected number of times unit$(I,J)$ is selected in the direct sample$)$;

$W_{Indirect,I,J} = 1/($Expected number of times unit$(I,J)$ is selected in the indirect sample$)$.

20. The algorithm evaluation system of claim 15, further comprising a system for calculating a recall measurement and a precision as follows:

recall=(all relevant records retrieved by the search algorithm)/(all relevant records in the database records); and precision=(all relevant records retrieved by the search algorithm)/(all records retrieved by the search algorithm).

21. A method for deploying a system for evaluating search algorithms, comprising:

providing a computer infrastructure being configurable to:
define a population of searches and database records from a search history database to provide a plurality of search/record pairs;

apply a sampling method and direct sampling rates to each search/record pair in the population of searches using a computing system, wherein search/record pairs having a higher variability relative to the population are assigned a relatively higher probability;

randomly sample a direct sample of search/record pairs with the computing system using the direct sampling rates to increase a likelihood of obtaining search/record pairs having the higher variability;

run a search algorithm and measure errors for at least one of the direct sample and for an associated indirect sample; and calculate an estimated error rate for the search algorithm using inverse probability weighting.

* * * * *